C. L. FLORA.
SHOCK ABSORBER.
APPLICATION FILED NOV. 24, 1914.

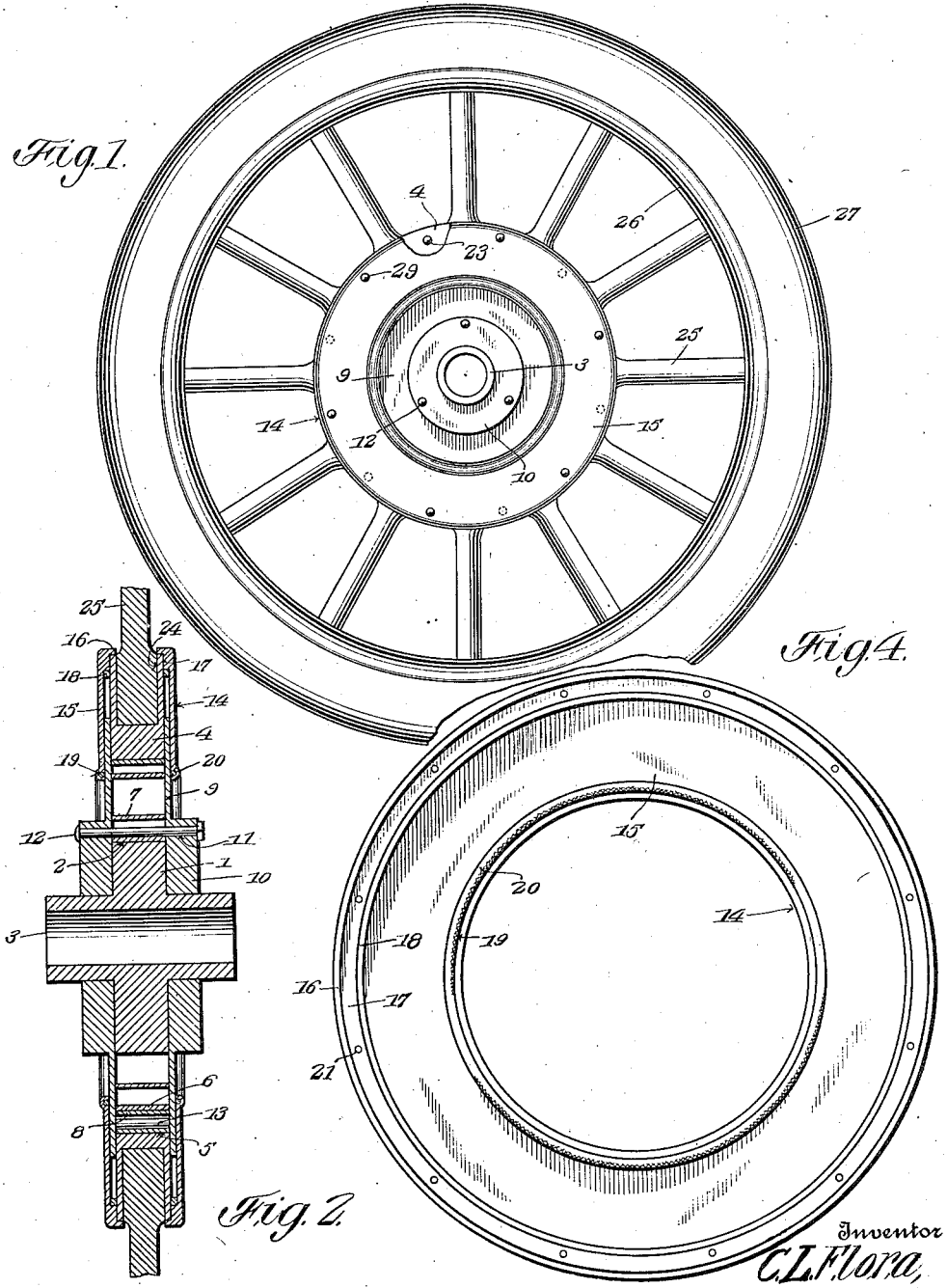

1,210,294.

Patented Dec. 26, 1916.
3 SHEETS—SHEET 2.

Inventor
C. L. Flora,

Witnesses

By Victor J. Evans
Attorney

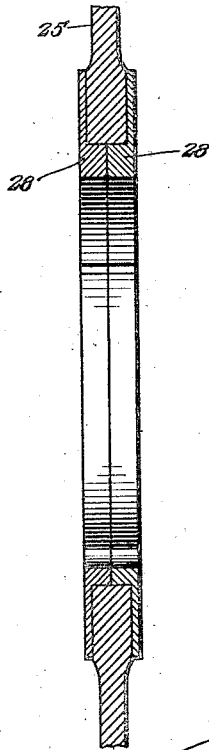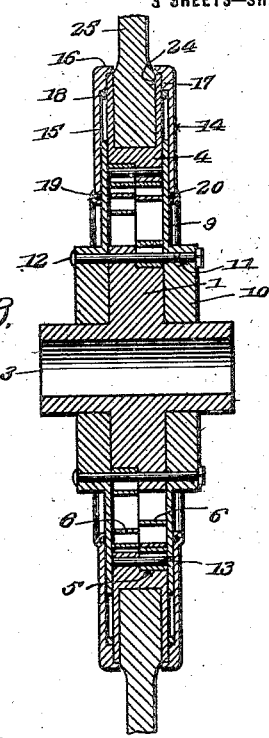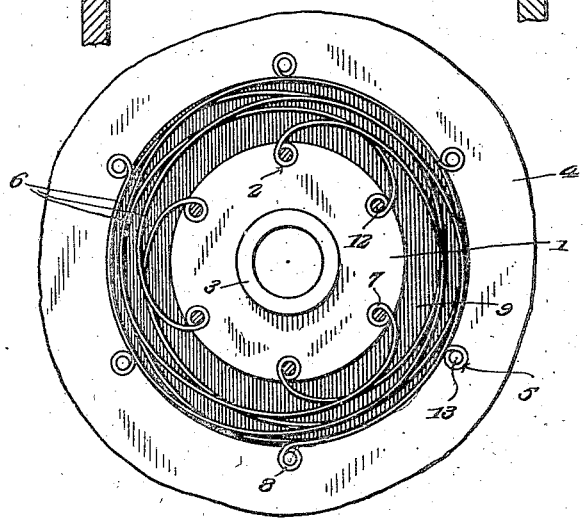

UNITED STATES PATENT OFFICE.

CHARLES L. FLORA, OF TOLEDO, OHIO, ASSIGNOR OF ONE-HALF TO FRED N. LAUBENTHAL, OF TOLEDO, OHIO.

SHOCK-ABSORBER.

1,210,294.   Specification of Letters Patent.   Patented Dec. 26, 1916.

Application filed November 24, 1914. Serial No. 873,785.

*To all whom it may concern:*

Be it known that I, CHARLES L. FLORA, a citizen of the United States of America, residing at Toledo, in the county of Lucas and State of Ohio, have invented new and useful Improvements in Shock-Absorbers, of which the following is a specification.

This invention relates to improvements in shock absorbers for vehicles and, in the present instance, is shown as embodied in a vehicle wheel, although I wish it to be understood that the invention may be applied in other ways.

In carrying out the present invention, it is my purpose to provide a shock absorber for motor vehicles and the like whereby the body of the vehicle and the wheel fellies may have relative movement in the event of the wheels engaging obstructions and depressions in the roadway and which when applied to the vehicle will insure the smooth and easy running thereof without pneumatic tires.

It is also my purpose to improve and simplify the general construction of shock absorbing devices and to provide a shock absorber which will embrace the desired features of simplicity, efficiency and durability, which may be manufactured, installed and maintained at a minimum expense and which may be so incorporated in the wheel structure as to render the same dust proof.

With the above and other objects in view, the invention consists in the construction, combination and arrangement of parts hereinafter set forth in and falling within the scope of the claim.

Figure 3:
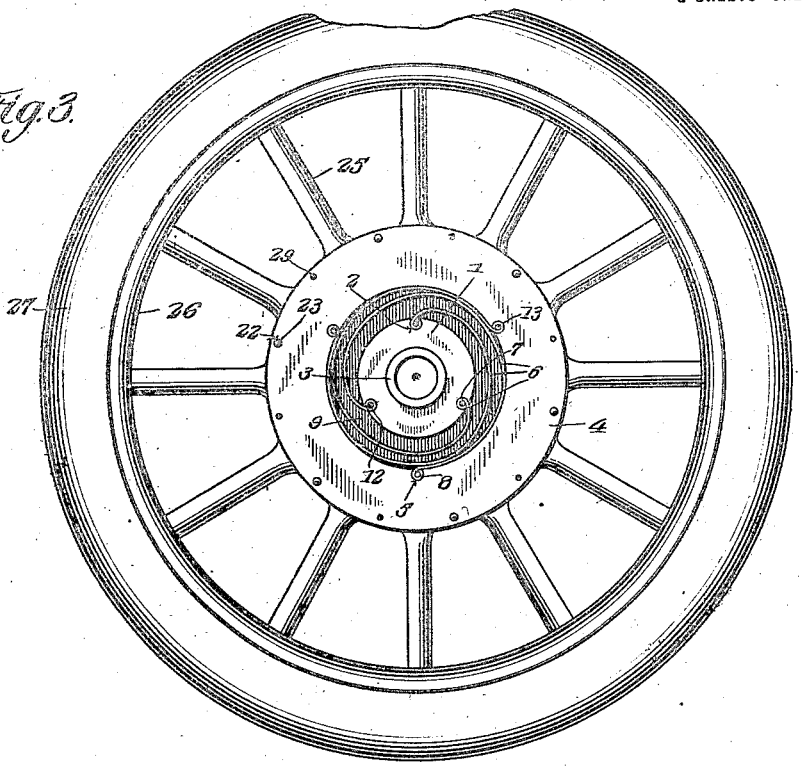
Figure 5:
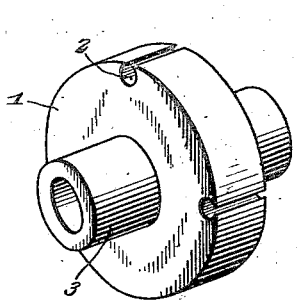
Figure 6:
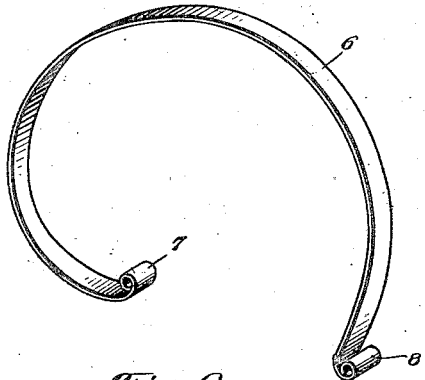

In the accompanying drawings: Figure 1 is a view in side elevation of a vehicle wheel equipped with a shock absorber constructed in accordance with the present invention. Fig. 2 is a transverse sectional view through the wheel. Fig. 3 is a view in side elevation of the wheel with one of the side plates removed. Fig. 4 is a view in side elevation of one of the outer shields showing the inner face thereof. Fig. 5 is a perspective view of the hub of the shock absorber. Fig. 6 is a similar view of one of the springs. Fig. 7 is a vertical sectional view showing a modified form of spoke receiving annulus. Fig. 8 is a vertical transverse sectional view through a modified form of shock absorbing device. Fig. 9 is a view in side elevation of the same, one of the end plates being removed.

Referring now to the drawings in detail, 1 designates a hub adapted to support the load and having the periphery thereof formed with transversely disposed ways 2. These ways are spaced apart about the periphery of the hub equal distances and each, in the present instance, is partially circular in cross section and has the restricted portion thereof opening onto the periphery of the hub. Passed through the hub centrally thereof and suitably secured thereto is a sleeve 3 having the end portions thereof projecting beyond the opposite sides of the hub. Surrounding the hub concentrically thereof is an annulus 4 having the inner edge thereof spaced apart from the periphery of the hub and formed with transverse ways 5 spaced apart equidistant and of a cross sectional configuration corresponding to that of the ways in the hub.

Disposed within the space between the periphery of the hub 1 and the inner edge of the annulus 4 are semi-coiled leaf springs 6 having the inner ends thereof looped as at 7 and seated within the ways 2 respectively, and the outer end portions overlapping one another and formed with loops 8 curved in a direction opposite the loops 7 and fitting within the ways 5 respectively in the inner edge of the annulus 4.

Disposed at opposite sides of the hub and annulus and mounted upon the respective ends of the sleeve 3 concentrically thereof, are end plates 9, each of the same diameter, as the other and of less diameter than the annulus 4, so that when the annulus moves relatively to the hub against the action of the springs and vice versa, when the hub moves relatively to the annulus, the peripheral edges of the end plates will remain within the marginal edge of the annulus.

The outer surfaces of the end plates 9 are formed with outwardly projecting bosses 10 respectively disposed concentrically of the ends of the sleeve and preferably of non-circular cross section and formed in these bosses are bolt holes 11 registering with the looped ends 7 of the semi-coiled springs 6 to receive securing bolts 12 whereby the end plates will be securely fastened to the hub and the inner ends of the springs secured within the respective ways. Disposed within the loops 8 at the outer ends of the springs within the ways 5 are keys 13 acting to hold the outer extremities of the springs within the respective ways.

14, 14 indicate shields disposed upon opposite sides of the annulus 4 and each in the form of a circular ring 15 disposed concentrically of the axis of the hub and having the inner edge thereof spaced apart from the boss 10 on the adjacent end plate and the peripheral edge formed with a laterally extending circumferential flange 16 encircling the adjacent edge of the periphery of the hub. The inner face of each shield 14 immediately adjacent to the flange 16 has secured thereto an annulus 17 and fastened to the inner edges of the annuli 17 are buffer bands 18 formed of rubber or analogous cushioning material and adapted to be engaged by the peripheries of the end plates 9 in the event of very great relative movement between the hub and the annulus 4. Formed in the inner face of the rings 15 immediately adjacent to the inner edges thereof are annular grooves 19 and disposed within the grooves 19 are circular gaskets 20 engaging the outer surfaces of the end plates to prevent undue friction between the end plates and the shields and eliminate the passage of dust and dirt between the shields and end plates. Formed in the shields 14, 14 adjacent to the peripheries thereof and in the annuli 17 on the inner faces of such shields are bolt holes 21 alining with similar holes 22 in the annulus 4 to receive securing bolts 23 whereby the shields and annulus 4 are rigidly secured together. These bolts are appropriately spaced apart about the shields and annulus 4 and formed in the periphery of the annulus 4 are radial sockets 24 spaced apart equidistant and secured within the sockets 24 are the inner ends of spokes 25 radiating from the annulus and secured to the outer ends of the spokes 25 concentrically of the annulus 4 is a felly 26 having the periphery thereof provided with an appropriate form of tire 27.

If desired, the annulus 4 may be formed of two circular sections 28 having the confronting faces thereof cut out to receive the inner ends of the spokes, as clearly illustrated in Fig. 7.

Passed through the annulus 4 adjacent to the periphery thereof are transverse securing bolts 29 alternating with the bolts 23 and acting to hold the inner ends of the spokes securely within the annulus. In the form of annulus illustrated in Fig. 7, the bolts 29 also function to maintain the sections 28 of the annulus in proper relative positions.

In practice, the sleeve 3 is slipped over the axle spindle and suitably secured thereon so that the wheel may freely rotate about such spindle. In the travel of the vehicle equipped with the wheels constructed in accordance with the present invention, should any one of the wheels strike an obstruction in the roadway the felly, spokes and annulus 4 will move relatively to the hub against the action of the springs 6, the latter absorbing the shock and so preventing undue vibration of the body of the vehicle. On the other hand, should one of the wheels drop into a depression, the hub of such wheel will move relatively to the annulus 4, spokes and felly, upon the wheel striking the bottom of the depression, the springs 6 taking up the shock in this movement of the hub. It will be noted that the hub, or felly, tends to move in a vertical direction against the action of the springs 6, when a depression or obstruction is met in the roadway, but the springs, being semi-coiled, cause the hub, or felly, to turn slightly in the vertical movement thereof thereby reducing the strain upon the springs and enabling the latter to effectively absorb the shock.

Should the drive wheels of a motor vehicle be equipped with shock absorbing devices constructed as illustrated and described, the rotation of the driving axle will be transferred from the hubs of the wheels fixed upon such axle through the springs to the annulus, spokes and felly, and the hubs, upon the initial application of power thereto, especially if the power is transferred to the driving axle suddenly, will tend to coil the semi-coiled springs 6 about the hub, thereby eliminating jarring of the vehicle in the starting thereof.

In Fig. 9 of the drawings, I have shown the shock absorbing device as composed of two sets of semi-coiled springs 6 disposed side by side, the coils of one set extending in a direction opposite from the coils of the other set, the inner ends of the coils being disposed within the ways in the periphery of the hub and secured therein as previously described, and the outer ends of the springs being fastened within the ways in the inner edge of the annulus 4. This construction of shock absorbing device will be found especially useful on the drive wheels of motor vehicles, as one set of springs will act to take up the shock of the too sudden starting of the vehicle in one direction, while the other set of springs will act in a like manner to take up the shock when the direction of movement of the vehicle is reversed.

In practice, the driving connections for the speedometer of the vehicle may be effected through the medium of one of the bosses 10; while the number of springs 6 and the strength of such springs may be varied in accordance with the load carried by the vehicle.

I claim:

In a device of the kind described in combination, a disk having opposing integral concentric hub portions and a central bore registering therewith, a wheel having a series of spokes, a circular ring into which the inner ends of the spokes project and being of a larger diameter than said disk but of equal width with respect thereto, a pair of shields engaging the opposite sides of said ring, each of said shields having an annular member providing a circular opening of larger diameter than said disk, said shields having right angular flanges fitting over said ring and inner circular ledges disposed laterally of the ring so as to space said shields from the rings, a buffer ring seated against each of said circular ledges and engaging the shields and ring respectively, a pair of end plates slidably engaging said ring and said shields, a pair of integral oppositely extending bosses formed upon said plates and having openings through which the hub sections project, a series of tie bolts passing through the bosses of the plate for holding them against transverse displacement, said bolts projecting through the ring, and a series of leaf springs secured between said plate and at one end to said tie bolts and at their opposite ends to the said ring.

In testimony whereof I affix my signature in presence of two witnesses.

CHARLES L. FLORA.

Witnesses:
 HERMAN GREINER,
 ANTON MUELLER.